[19] United States Patent
van der Ploeg et al.

[11] Patent Number: 4,472,339
[45] Date of Patent: Sep. 18, 1984

[54] METHOD OF MAKING A PLASTIC CHEESE MOLD

[75] Inventors: Dirk C. H. van der Ploeg, Oud-Beyerland; Marinus H. Vellekoop; Hendrik Palte, both of Rotterdam, all of Netherlands

[73] Assignee: B.V. Hollandse Plastic Industrie Rotterdam, Netherlands

[21] Appl. No.: 424,913

[22] Filed: Sep. 27, 1982

Related U.S. Application Data

[60] Division of Ser. No. 313,966, Oct. 22, 1981, , which is a continuation of Ser. No. 114,499, Jan. 23, 1980, abandoned.

[30] Foreign Application Priority Data

Feb. 1, 1979 [NL] Netherlands .......................... 7900831

[51] Int. Cl.³ .............................................. B29H 9/02
[52] U.S. Cl. .................................... 264/219; 249/113; 249/134; 264/257; 264/DIG. 48; 425/84
[58] Field of Search .................. 425/84; 249/113, 134; 264/257, 219, DIG. 48

[56] References Cited

U.S. PATENT DOCUMENTS

| 2,815,534 | 12/1957 | Ising et al. | 264/257 |
| 3,087,201 | 4/1963 | Williams et al. | 264/257 |
| 3,287,807 | 11/1966 | Menke | 425/84 |
| 3,838,955 | 10/1974 | Dubbeld | 425/84 |
| 3,975,479 | 8/1976 | McClean | 264/257 |
| 4,130,622 | 12/1978 | Pawlak | 264/257 |
| 4,186,235 | 1/1980 | Bromwell | 264/257 |

FOREIGN PATENT DOCUMENTS

| 2236412 | 3/1975 | France | 249/134 |
| 68992 | 6/1951 | Netherlands . | |
| 112406 | 6/1964 | Netherlands . | |
| 122578 | 9/1965 | Netherlands . | |
| 1161426 | 8/1969 | United Kingdom . | |

Primary Examiner—James H. Derrington
Attorney, Agent, or Firm—Ostrolenk, Faber, Gerb & Soffen

[57] ABSTRACT

A cheese mold of polyolefin material having a nonwoven inner layer of polyolefin fibers which is heat welded to the mold surface is disclosed. A method for manufacturing the mold is also provided. A non-woven layer of fibers is provided and a liquid mass of plastic is heat sealed thereto by extrusion or injection molding.

4 Claims, 3 Drawing Figures

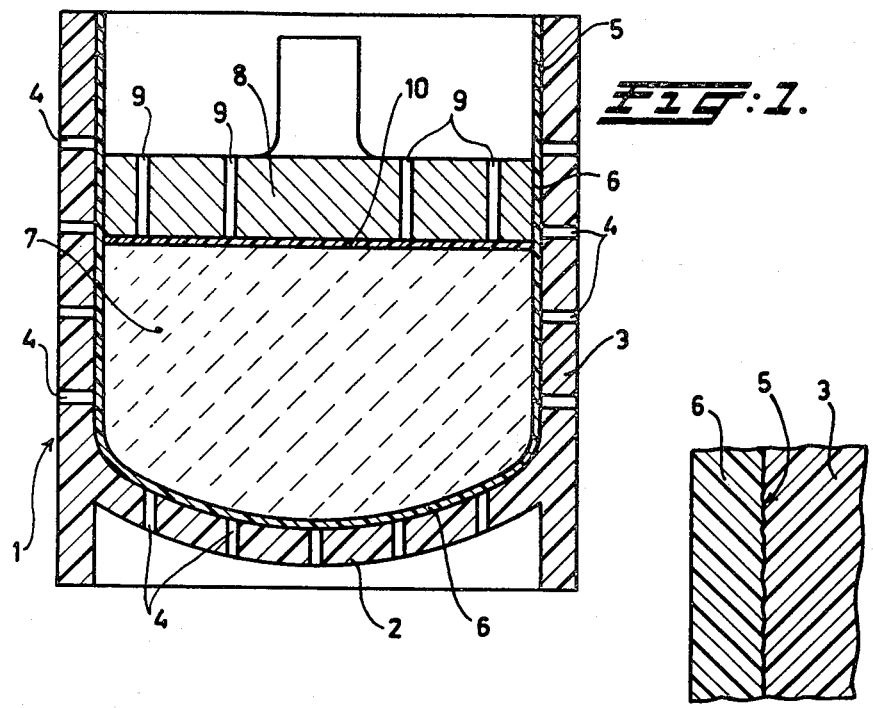
Fig. 1.
Fig. 3.
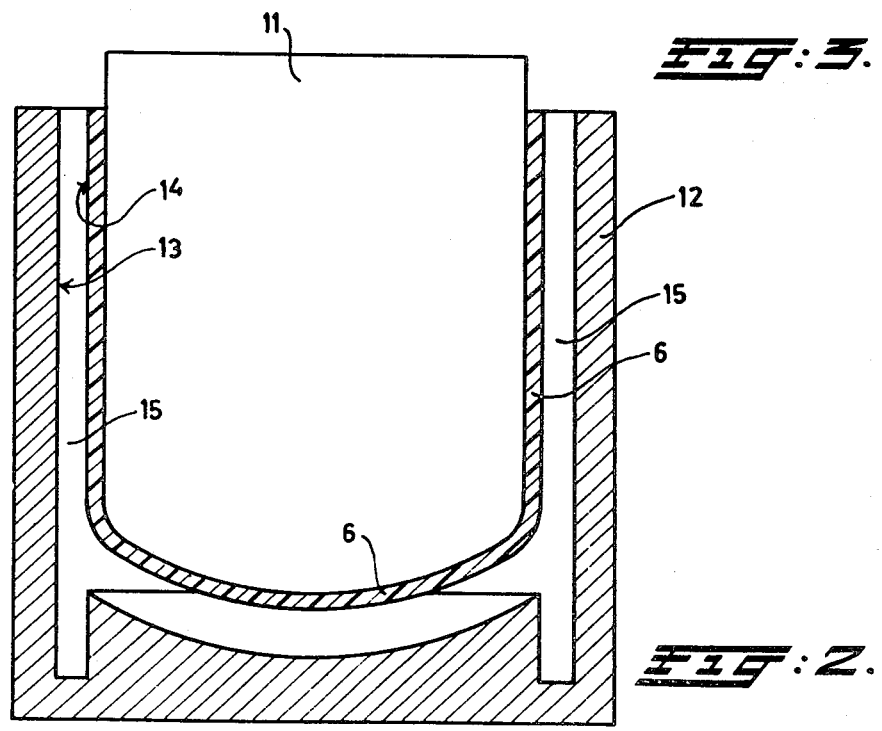
Fig. 2.

METHOD OF MAKING A PLASTIC CHEESE MOLD

This is a division of U.S. patent application Ser. No. 313,966 filed Oct. 22, 1981 which is a continuation of application Ser. No. 114,499, filed Jan. 23, 1980, now abandoned.

BACKGROUND OF THE INVENTION

The present invention concerns a plastic article, more particularly a plastic cheese mold.

Plastic cheese molds are known per se.

A plastic cheese mold is known, for example, consisting of polyethylene or polypropylene, having at least in its bottom apertures for drainage of the whey separated during the pressing of curd. In the known plastic cheese mold there is a removable net of elastic plastic material, such as, for example, polyethylene or polypropylene, which is suspended for receiving curd to be pressed. This net is connected with a ring being supported by the upper edge of the plastic cheese mold. By means of a follower, the curd in the net can be submitted to the desired pressure for molding the cheese.

Although the results with the latter cheese mold are particularly good, this cheese mold has the disadvantage that the pressed cheese has to be removed together with the plastic net from the plastic cheese mold, before it is possible to separate the molded cheese and the cheese net from each other. This means an individual manipulation involving an increse of costs.

It is the object of the present invention to provide a plastic article, more particularly a plastic cheese mold, which does not suffer from the abovementioned disadvantages.

SUMMARY OF THE INVENTION

According to the invention, this object is attained in that a wall of the plastic article, more particularly a plastic cheese mold, it intimately fixed to a layer of a porous material.

In using such a plastic cheese mold, the cheese can be removed directly from the plastic cheese mold, as the cheese loosens easily from the layer of porous material.

On the other hand, the layer of porous material presents the advantage that also the last moisture residues are removed from the pressed curd by the moisture-absorbing activity of the porous material. This means that pressed cheese less moisture containing may be obtained by means of this cheese mold.

Another advantage is that the cheese, without being manipulated, may run with the cheese mold for a certain time, which is a condition for obtaining cheese of good quality. In the case of the plastic cheese molds comprising plastic nets, known per se, the plastic net with the pressed cheese has to be removed from the mold and the unit should be allowed to recycle for a certain time, to wit for about one and a half hours, after which period the net may be separated from the pressed cheese.

Advantageously the layer of porous material consists of a non woven layer, particularly a non-woven layer, at least partially consisting of thermoplastic fibers being weldable to the material of the plastic cheese mold.

The use of a porous layer according to the present invention produces on the one hand a layer which efficiently absorbs the moisture released during the pressing of the curd, which moisture drains off through the apertures in the cheese mold. On the other hand, the thermoplastic fibers in the non-woven layer enable the non-woven layer to be welded directly to the plastic cheese mold.

The non-woven layer is efficiently connected with the wall of the plastic article, particularly a plastic cheese mold, by forming the plastic article around the preformed non-woven layer, in particular by extrusion and more particularly by injection molding of the plastic material.

Extremely advantageous is a non-woven layer of polypropylene fibers or polyethylene fibers which are weldable to the material of the plastic cheese mold. Moreover, such a non-woven layer presents the great advantage that it can easily be cleaned with known detergents which are also used for cleaning the plastic cheese molds.

The present invention also relates to a method of molding a plastic article, more particularly a plastic cheese mold, starting from a plasticized plastic material, a layer of porous material being preformed and shaping at least on one side of this layer of porous material a plastic article from a thermoplastic material, bonding the layer of porous material to the wall of the plastic article during molding.

Preferably the method comprises the injection molding of a polyolefin plastic material onto a non-woven layer of polyolefin plastic material, being weldable to the plastic material of the cheese mold.

SURVEY OF THE DRAWINGS

FIG. 1 shows a cross-section of a cheese mold according to the invention;

FIG. 2 shows a mold with the plastic cheese mold with a layer of porous material formed therein and FIG. 3 shows a cross-section on an enlarged scale of the wall of a cheese mold with the non-woven layer welded thereto.

DESCRIPTION OF A PREFERRED EMBODIMENT

FIG. 1 illustrates a polypropylene plastic cheese mold 1. The cheese mold comprises a body having a bottom 2 and a cylindrical wall portion 3 in the bottom, which define a cavity in which cheese is molded; if desired, in the wall of the cylindrical portion 3 apertures 4 are also provided for removing the whey.

Inside the cheese mold 1 is attached a layer 6 of porous material. This layer consists preferably of a non-woven layer of thermoplastic fibers, at least part of the fibers consisting of thermoplastic material being weldable to the material of the cheese mold 1, at elevated temperatures. In using a polypropylene plastic cheese mould 1, a non-woven layer of polypropylene material is used and in case of a polyethylene cheese mold, it will be efficient to apply a porous layer 6 of polyethylene material.

By welding fibers of the layer 6 of the non-woven layer to the inner wall 5 of the plastic mould 1, a rigid connection between the non-woven layer 6 and the wall 5 of the plastic cheese mold 1 is obtained.

This means that, after pressing a cheese 7 in the mold, the mold together with the cheese may be allowed to recycle for a certain time without being touched or manipulated for curing the formed cheese, whereafter the cheese 7 is removed from the cheese mold without the non-woven layer 6 being removed.

For cleaning the non-woven layer 6 detergents normally used for cleaning the plastic cheese mold 1, may be applied.

For forming cheese from curd, use is made of a pressure exerting member or follower B preferably consisting of a plastic material, and being provided with follower apertures 9, the side of the follower facing the inside of the mold having a layer 10 of non-woven layer, such as used for coating the inside of the cheese mould.

By means of non woven 10 in combination with the non woven layer 6, an optimum removal of moisture is obtained as the non wovens 6 and 10 absorb the moisture, which absorbed moisture flows off to the exterior through the apertures 4 in the cheese mould and/or in the follower apertures 9 in the follower 8.

Manufacturing a plastic cheese mould according to the invention proceeds as follows.

A non woven 6 of polypropylene material is arranged on a mandrel 11 of an injection mould and measures are taken to ensure that this non woven 6 is adapted to the final form which the non woven has to take in the finished cheese mould.

Around the mandrel 11 with the non woven 6 arranged thereon, an outer mould 12 is provided, whereafter the space between the inner wall 14 of the outer mould 12 and the wall 14 of the preformed non woven 6 is filled with a polypropylene material thereby forming the cheese mould 1.

As a result of the high temperature in the space 15 the fibers on the outer surface of the non woven will be welded to the polypropylene material in the space 15 and thereby a strong connection between the non woven 6 and the cheese mould 1 formed in the space 15 is obtained. Before injection moulding the non woven has a thickness of 3 mm and after injection moulding a thickness of 1.5 mm.

FIG. 3 illustrates part of the non woven and of the plastic cheese mould on an enlarged scale; it is clearly shown that the inner surface 5 of the plastic cheese mould 3 is rather irregular which contributes to an optimal discharge of whey to be removed from the curd during pressing.

What is claimed is:

1. A process of manufacturing a plastic cheese mold, comprising:
   providing a mold having a cavity defined in it, which cavity is shaped to define the exterior wall of the container, and which mold is further comprised of a mandrel, or the like, fitted into the cavity, wherein the mold defines an outer, inwardly facing wall of the cavity and the mandrel, or the like, defines an opposite, inner, outwardly facing wall, and the mold and the mandrel, or the like, being shaped to define a relatively thin walled opening between the outer and opposite inner walls thereof;
   applying a porous non-woven layer of polyolefin fibers to the inner wall of the mold; and
   filling the cavity by injection moulding with a liquid mass of polyolefin material at an elevated temperature selected for the polyolefin material to heat seal to the fibers of the non-woven layer.

2. The process of manufacturing a plastic cheese mold of claim 1, wherein after filling the cavity, permitting the plastic material to cool for welding the fibers at the exterior of the non-woven layer to the plastic material.

3. The process of manufacturing a plastic cheese mold of claim 1, wherein the mass of polyolefin material and the non-woven layer of polyolefin fibers comprise the same polyolefin material.

4. A process of manufacturing a plastic cheese mold, comprising:
   providing a mold having a cavity defined in it, which cavity is shaped to define the exterior wall of the container, and which mold is further comprised of a mandrel, or the like, fitted into the cavity, wherein the mold defines an outer, inwardly facing wall of the cavity and the mandrel, or the like, defines an opposite, inner, outwardly facing wall, and the mold and the mandrel, or the like, being shaped to define a relatively thin walled opening between the outer and opposite inner walls thereof;
   applying a porous non-woven layer of polyolefin fibers to the inner wall of the mold; and
   filling the cavity by extrusion from a liquid mass of polyolefin material at an elevated temperature selected for the polyolefin material to heat seal to the fibers of the non-woven layer.

* * * * *